(12) United States Patent
Erd et al.

(10) Patent No.: US 10,800,064 B2
(45) Date of Patent: Oct. 13, 2020

(54) LONGITUDINAL CUTTING OF A BAND OF A SOFT FOOD MASS

(71) Applicant: Hochland SE, Heimenkirch (DE)

(72) Inventors: Andreas Erd, Simmerberg (DE); Andreas Biggel, Hergatz (DE); Franz Stadelmann, Opfenbach (DE)

(73) Assignee: Hochland SE, Heimenkirch (DE)

( * ) Notice: Subject to any disclaimer, the term of this patent is extended or adjusted under 35 U.S.C. 154(b) by 233 days.

(21) Appl. No.: 15/532,646

(22) PCT Filed: Dec. 3, 2015

(86) PCT No.: PCT/EP2015/078489
§ 371 (c)(1),
(2) Date: Jun. 2, 2017

(87) PCT Pub. No.: WO2016/087571
PCT Pub. Date: Jun. 9, 2016

(65) Prior Publication Data
US 2017/0355092 A1 Dec. 14, 2017

(30) Foreign Application Priority Data

Dec. 4, 2014 (DE) .................. 10 2014 117 848

(51) Int. Cl.
*B26D 7/18* (2006.01)
*A01J 27/04* (2006.01)
(Continued)

(52) U.S. Cl.
CPC ............ *B26D 7/1818* (2013.01); *A01J 27/04* (2013.01); *B26D 1/151* (2013.01); *B26D 7/32* (2013.01);
(Continued)

(58) Field of Classification Search
CPC ........... A01J 27/00; A01J 27/045; B26D 7/18; B26D 7/1818; B26D 7/27; B26D 7/32;
(Continued)

(56) References Cited

U.S. PATENT DOCUMENTS

| 4,033,074 A | 7/1977 | Lutts | |
| 4,340,342 A * | 7/1982 | Kim | B26D 1/38 |
| | | | 264/118 |

(Continued)

*Primary Examiner* — Andrea L Wellington
*Assistant Examiner* — Richard D Crosby, Jr.
(74) *Attorney, Agent, or Firm* — Robert S. Lelkes

(57) ABSTRACT

A device for the longitudinal cutting of a wide food band of a soft food mass which is moved in a conveyance direction on a conveyor belt, wherein a cutting cylinder rotating in the conveyance direction is provided on which is mounted a number of cutting disks disposed coaxially to the rotational axis A for cutting into the food band with the edge thereof, wherein a comb having a plurality of comb tines is provided, which in an operating position engage into the intermediate spaces between the cutting disks during the longitudinal cutting in order to hold down the cut strips on the conveyor belt, wherein the comb is held on a comb holder so as to be pivotable about the rotational axis, wherein the comb holder can be transferred from the operating position and a maintenance position by pivoting about the rotational axis.

9 Claims, 4 Drawing Sheets

(51) Int. Cl.
   *B26D 1/15* (2006.01)
   *B26D 7/32* (2006.01)
(52) U.S. Cl.
   CPC ............... *B26D 2007/1809* (2013.01); *B26D 2007/189* (2013.01); *B26D 2210/02* (2013.01)
(58) Field of Classification Search
   CPC ............ B26D 2210/00; B26D 2210/02; B26D 2210/04; B26D 2210/06; B26D 2210/08
   See application file for complete search history.

(56) References Cited

U.S. PATENT DOCUMENTS

| | | | | |
|---|---|---|---|---|
| 4,638,934 A * | 1/1987 | Fram | ........................ | B26D 3/18 225/97 |
| 4,646,632 A * | 3/1987 | Gutierrez Rubio | .... | A23N 4/085 83/425.3 |
| 4,782,729 A * | 11/1988 | Mathot | .................... | B26D 3/22 83/342 |
| 4,988,528 A * | 1/1991 | Tomoda | ................. | A21C 11/24 426/451 |
| 5,129,299 A * | 7/1992 | Fischer | .................... | B26D 3/22 83/121 |
| 5,601,855 A * | 2/1997 | Fager | ..................... | A01J 25/00 425/294 |
| 8,322,970 B2 * | 12/2012 | Ward | .................... | F01L 1/3442 198/721 |
| 8,783,142 B2 * | 7/2014 | Biggel | .................... | A01J 27/04 83/39 |
| 2005/0005745 A1 * | 1/2005 | Akins | ...................... | B26D 3/20 83/13 |
| 2010/0275751 A1 * | 11/2010 | Zeuschner | .............. | A01J 27/04 83/13 |
| 2011/0138636 A1 | 6/2011 | Ishii et al. | | |
| 2011/0179750 A1 * | 7/2011 | Smith | ................ | A01F 15/0715 53/399 |
| 2016/0325456 A1 * | 11/2016 | Wangler | .................... | B26D 7/32 |
| 2017/0173813 A1 * | 6/2017 | Palese | ................. | B26D 7/2621 |
| 2017/0190066 A1 * | 7/2017 | Fastabend | ................ | B26D 1/03 |
| 2017/0210022 A1 * | 7/2017 | Szilagyi | ................... | B26D 1/30 |
| 2017/0355092 A1 * | 12/2017 | Erd | ......................... | A01J 27/04 |
| 2018/0071941 A1 * | 3/2018 | Wangler | .................... | B26D 7/32 |
| 2018/0361606 A1 * | 12/2018 | Banowetz | ................ | B26D 3/22 |
| 2019/0084174 A1 * | 3/2019 | Wilson | ................ | B26D 7/0625 |

\* cited by examiner

LONGITUDINAL CUTTING OF A BAND OF A SOFT FOOD MASS

CROSS-REFERENCE TO RELATED APPLICATIONS

This application is the US national phase under 35 USC § 371 of international patent application no, PCT/EP2015/078489 filed on Dec. 3, 2015, which claims priority under 35 USC § 119 based on German patent application no. 102014117848.3 filed on Dec. 4, 2014.

FIELD OF THE INVENTION

The invention relates to a device for the longitudinally cutting of a wide band of a soft food mass, in particular a cheese mass, which is moved in a conveyance direction on a conveyance means, in particular on a conveyor belt, into a number of narrow strips parallel to the conveyance direction. To this end, the device comprises a blade roller rotating in the conveyance direction, on which blade roller a number of cutting disks corresponding to the number of strips to be produced is mounted for the longitudinal cutting, wherein the cutting disks are disposed coaxially to the rotational axis and cut into the band with the outer edge thereof during the rotation. In addition, a comb having a plurality of comb tines is provided, which comb tines, in an operating position, engage into the intermediate spaces between the cutting disks during the longitudinal cutting in order to hold down the strips cut from the food mass on the conveyance means, in particular on the conveyor belt.

BACKGROUND OF THE INVENTION

Since the strips of the cut band of a soft food mass (also referred to as "food band") become stuck between the cutting disks after the longitudinal cutting, said strips tend to follow the rotary motion of the cutting disks and, therefore, lift up off of the conveyor belt. This can cause the strips to tear and can jam the device. This lifting is prevented by the tines, which hold down the food band on the conveyance device and thereby release said food band from the intermediate spaces.

Such a device is known from U.S. Pat. No. 5,601,855, for example, in which a food band of processed cheese is directed via a conveyor belt to a cutting device. Two opposing cutting rollers initially cut the food band into longitudinal strips before the thus cut strips reach a transverse cutting device, which cuts the cut strips transversely to the conveyance direction. In this case, the cutting rollers comprise a plurality of cutting blades, in the form of circular cutting disks, which are oriented parallel to one another and parallel to the conveyance direction. Tines, as hold-down devices, are provided in intermediate spaces between two cutting disks and prevent the cut strips from following the cutting blades after having been cut and, instead, allow said cut strips to be transported further in the conveyance direction. In this case, the risk of adhesion between the cutting blades is that much greater, the greater the amount of displaced food product is, and the narrower the longitudinal strips are relative to the thickness of the cutting blades and the number thereof.

During the processing of viscous food masses, in particular during the processing of industrially produced cheese, the cutting disks as well as the hold-down tines must be regularly cleaned of product residue. When the tines are re-inserted into the intermediate spaces between the cutting disks, it must be ensured, of course, that exactly one tine is inserted into each intermediate space. In the case of such devices, in particular, which cut extremely thin strips having a strip width of a few millimeters, the tines are filigree structures, which are usually made from plastic and are easily damaged.

In addition, the gap region between the cutting disks is difficult to access from the outside, and so it is difficult to position the tines exactly within the intermediate spaces without damage occurring during the positioning. If such a known comb holder is moved out of the intermediate spaces in order to be removed, every single tine must precisely enter the respective intermediate space again in the subsequent installation. Since the tines are flexible, due to the material from which they are made, and cannot be positioned exactly due to production tolerances, some of them must be individually manually oriented into the intermediate spaces, which requires a corresponding amount of time. Individual tines can easily break if consideration is not given for misalignment and a vigorous start-up motion.

The problem addressed by the present invention is therefore that of improving a device for cutting a food band of a viscous food mass of the initially mentioned type, using a simple design, in such a way that the comb tines can be easily inserted into the intermediate spaces and the device meets the highest standards for cleanliness.

SUMMARY OF THE INVENTION

The problem addressed by the invention is solved by a device according to claim 1 and a process according to claim 8; preferred embodiments shall become apparent from the respective dependent claims.

According to the invention, the comb is held on a comb holder, which is mounted so as to be pivotable about the rotational axis (A) of the blade roller. This comb holder can be transferred from the operating position into a maintenance position via simple pivoting about the rotational axis. In the maintenance position, the comb tines therefore advantageously remain in the intermediate spaces and are only pivoted into a position in which they are easily accessible for cleaning purposes.

BRIEF DESCRIPTION OF THE DRAWINGS

The invention is explained in greater detail in the following with reference to the figure, in which.

DETAILED DESCRIPTION OF THE INVENTION

Figure 1:
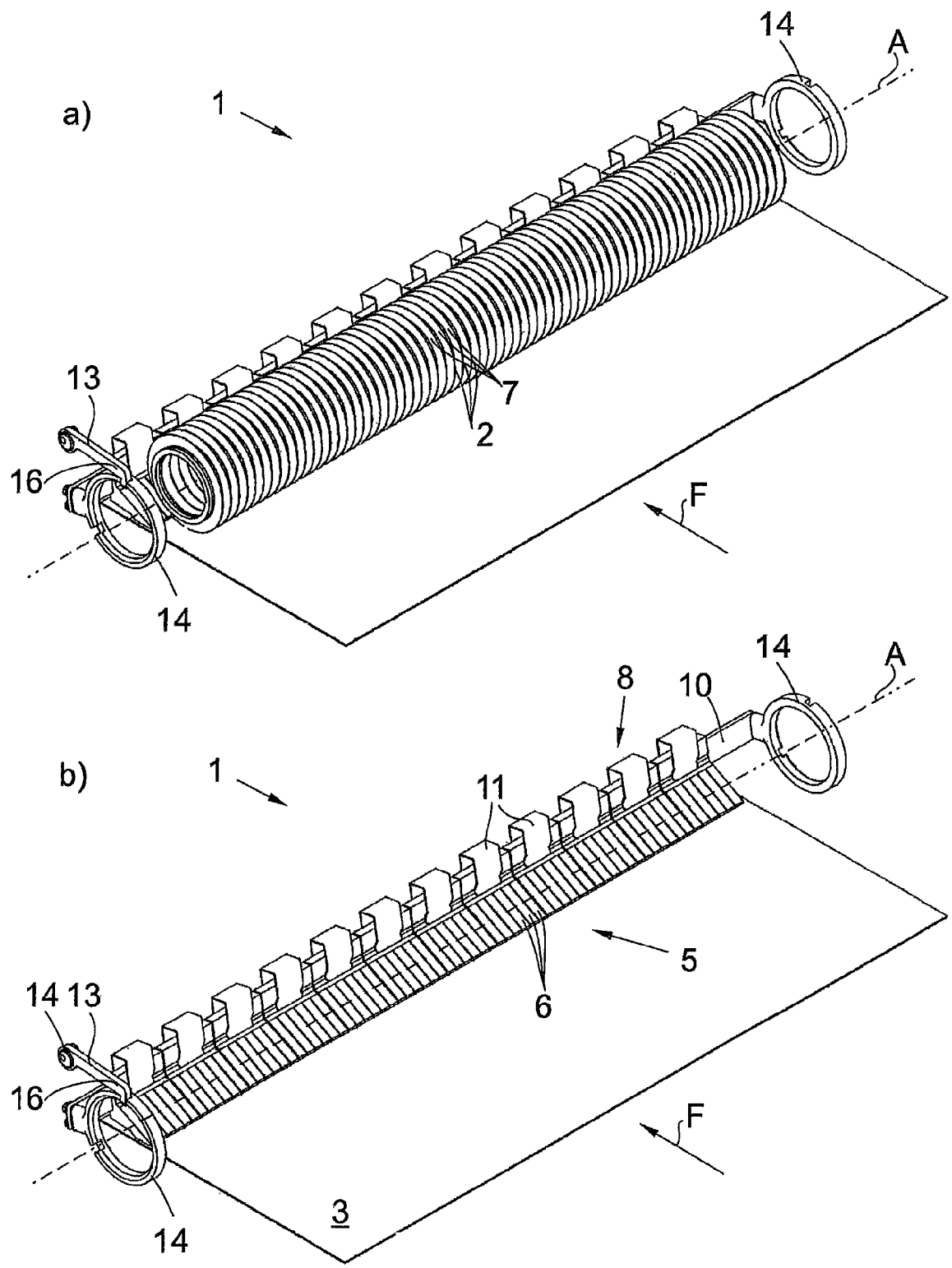
FIG. 1 shows a perspective view of a device according to the invention,
  a) with cutting blades,
  b) without cutting blades.

Given that the pivoting takes place about the rotational axis, the radial position of the tines relative to the rotational axis does not change. Instead, the maintenance position is merely a circumferential position of the tines that has been changed as compared to the operating position, relative to the rotational axis. The tines therefore do not need to be inserted into the intermediate spaces when transitioning between the maintenance position and the operating position. The risk of damage or any type of faulty installation when pivoting into the operating position is therefore avoided.

In this case, the operating position of the tines is understood to be a position of the tines or the comb holder for holding the tines in which the device carries out the cutting of the food band as intended. In this position, the tines act as hold-down devices for the food band and prevent the food band or the cut strips from following the cutting disks in the circumferential direction and lifting off of the conveyor belt.

In accordance with the particular conditions that are present, which can depend on the properties of the product and the processing speed, the operating position can be associated with a smaller or larger pivot angle. The pivot angle can be measured, for example, in the inclination of the comb tines with respect to the product band. In this way, an operating position having a pivot angle of approximately 30° can be advantageous, at which the comb has no direct contact with the product band during normal operation. In one particular embodiment, multiple operating positions having different pivot angles are specified, between which it is then possible to comfortably switch using few manipulations.

In the maintenance position, however, the comb and the tines can be cleaned and/or removed. In contrast to the maintenance position, access to the tines or the comb in the operating position is made difficult by a conveyor belt or another conveyance device.

The comb holder is preferably fastened to a housing of the device via a rotary bearing. The rotary bearing therefore supports the comb holder coaxially to the rotational axis and, therefore, to the cutting disks. In addition, it is advantageous when the comb holder comprises a guide rail, which is oriented parallel to the rotational axis and on which the comb is installed. The guide rail preferably has a constant rail cross-section, and therefore the comb is held on the guide rail so as to be displaceable, in principle. It is pointed out here that the comb can be composed of a plurality of comb elements, all of which are held on the guide rail in the same manner. The subdivision of the comb into a plurality of comb elements substantially simplifies the installation.

The comb or the comb elements can be floatingly mounted, in a way, on the guide rail and can therefore assume different axial positions on the guide rail. In this case, a certain amount of axial play is advantageous when positioning the tines in the intermediate spaces. The comb holder can comprise, in particular, a stop in the radial direction, in particular radially outward. Furthermore, the comb holder can comprise two opposed stops for the comb in the circumferential direction, with the aid of which the comb is held on the guide rail in the circumferential direction in a defined manner.

Preferably, the radial position of the comb or the comb elements (in the following, the term "comb" will also be used to refer to the individual comb elements) with respect to the comb holder is fixed by means of fastening clamps. The fastening clamp forms a second stop for the comb in the radial direction, whereby the comb is radially fixed. The fastening clamp can act upon the comb radially toward the guide rail, thereby at least preventing the comb from becoming detached from the fastening rail. The fastening by means of the fastening clamps is particularly easy and makes rapid (de)installation possible.

On the one hand, the clamp clamps the comb onto the guide rail so strongly that the comb is frictionally held on the guide rail and is sufficiently fixed. On the other hand, the comb can be held on the guide rail so as to be capable of floating in the axial direction. In such an embodiment, therefore, there is no frictional connection or positive engagement between the rail, which would prevent the comb from being displaced along the rail. The retention of the axial position along the rail is therefore achieved by the cutting disks themselves, which act as a type of axial stop for the tines. In the two aforementioned variants, the tines are preferably disposed in the intermediate spaces with axial play of approximately at most 0.5 mm.

In the device according to the invention, it therefore does not matter how many blades the blade roller has, and at what intervals. The device makes it possible to provide different blade rollers having corresponding combs for various products. This modular design ensures maximum flexibility.

Preferably, the comb holder is held in the operating position and in the maintenance position by means of a fixing means, wherein the fixing means itself is held in an adjustable manner on a housing part of the device. The adjustment of the fixing means makes it possible to adjust the comb and, therefore, the comb tines in the operating position. This adjustability therefore makes it possible to exactly adjust the operating position of the comb tines in circumferential positions, which causes the comb tines to rise or lower by a certain extent with respect to the food band. The gap width between the comb and the conveying device or the food band is therefore adjusted via the circumferential position. This gap defines the maximum height by which the food band is lifted off of the conveyance device. In addition, the gap can be adapted to the thickness of the food band.

In a preferred embodiment, the fixing means is fastened on a housing part of the device, at least indirectly, by means of an eccentric, which is clamped via a screw in particular. By changing the rotational position of the eccentric, the spacing of the fixing means at the fastening point on the housing can be changed, whereby the circumferential position of the operating position is ultimately adjusted. Particularly advantageously, the fixing means is a pawl or a latching lever, which engages into the pivotable comb holder and is held on the housing by means of the eccentric support. The operating position of the comb holder can be adjusted by rotating the eccentric support.

In addition, it is advantageous when the comb or the comb elements are produced as one piece from a dimensionally stable plastic, for example from PVDF. The comb tines are then formed by solid fingers, which are cut from the plastic block and, in the operating position, each engage into the intermediate spaces. The cutting disks run, so to speak, in the incisions such that said incisions are contactlessly situated at the lateral surfaces of the cutting disks with a small separation of a few tenths of a millimeter. Due to the close contact, it is ensured that the food product cannot pass through the gap between the lateral surface and the finger.

Given that plastic is used as the production material, the undersides of the fingers facing the food product can be shaped in such a way that ensures that the food product will be transported along the underside in an optimal manner. The fingers can have a deflection surface facing the cut strips, which is placed against the moving food band at a deflection angle. It is then possible to also adjust the deflection angle in the operating position via the adjustment by means of the eccentric. In addition, differently shaped combs can be provided for various food products to be processed, said combs being easily swapped out. In this regard, the device according to the invention provides advantageous modularity.

In order to avoid a possible jam of the food product at the blade roller, it is advantageous to design the comb holder in such a way that said comb holder can automatically pivot upward under a defined pressure applied by the food product, for example when a multilayer product band is present. This can be achieved in that the fixed travel delimitation, in particular by means of the latching lever, acts in only one direction. When acted upon in the other direction, the latch can disengage and lift the comb, including the comb holder, upward via rotation, thereby enlarging the gap between the comb and the conveyor belt. When the gap is enlarged, the food product can automatically become unjammed. After the jam has been cleared, the comb holder automatically lowers again under its own weight and/or via suitable means so that the latching lever latches in again and the previously set gap size is restored. In this manner, a product jam and the associated subsequent disruptions can be avoided.

It is also particularly advantageous to facilitate an adjustment of the comb position and, therefore, the gap spacing by holding the comb in an adjustable position on the guide rail. For this purpose, the comb holder comprises means which allow for a height adjustment of the comb holder in the operating position tangentially to the rotational axis, wherein the gap width can be adjusted by means of the height adjustment. This also makes it possible to adapt the comb to the geometry of the food band.

The invention further relates to a method for installing the comb on a device of the aforementioned type, having the following method steps: Fastening the comb on a comb holder in the maintenance position, moving the comb holder out of the maintenance position into the operating position by pivoting the comb holder about the rotational axis of the cutting disks. The method is distinguished by the fact that the comb holder is transferred out of the maintenance position and into the operating position by pivoting the comb holder about the rotational axis of the cutting means.

Preferably, the tines of the comb are inserted into the particular intermediate spaces between two cutting disks while the comb holder is in the maintenance position. The fact that the comb holder and the combs are more easily accessible in the maintenance position makes it easier to insert the tines into the intermediate spaces in this position. The pivoting does not change anything about the completed insertion of the tines into the intermediate spaces.

In a preferred embodiment, the tines are first inserted into the intermediate spaces; subsequently, the comb is installed onto the comb holder. The tines can therefore be initially inserted into the intermediate spaces. During this inserted situation, the tines are moved in the direction toward the comb holder. The cutting disks act as guides and hold the tines in an axial position, in which said tines are inserted into the intermediate spaces, during the installation onto the comb holder. This can be carried out, in particular, when a plurality of combs, each of which has a reasonable number of tines, is installed onto the comb holder. As a result, each comb can be easily positioned individually, one after the other, manually at first. Once the tines of the combs have been arranged in the intermediate spaces, the tines do not emerge from these intermediate spaces as installation continues.

The fixing means is used, in the operating position, in order to fix the comb. In particular, the fixing means are at least indirectly brought into engagement with the comb holder. In order to adjust the gap width between the comb and the conveyance device, the relative position of the fixing means with respect to the housing of the device can be changed in a defined manner by means of the eccentric or another adjusting device.

In addition to the modular design provided by the device according to the invention via the installation of different comb holders, combs, and blade rollers, a further noteworthy advantage is that the device meets the highest standards for cleanliness due to its few components, which can be easily accessed and effectively cleaned.

A further advantage is that the comb can be used universally with various types of blades, for example revolving blades, perforated blades, and toothed blades. Optimal cutting of different food products can be achieved by selecting the blade accordingly. For example, a toothed blade minimizes the product displacement.

In addition, it is advantageous that the behavior of the food band can be influenced by the comb geometry, in particular by the design of the underside of the tines. For example, for certain types of food, a long comb or a comb having long tines can dampen the oscillations of the food band and therefore steady the flow of the food band. In particular, it is advantageous specifically in the case of long tines to provide the deflection surface of the comb facing the product with slanted ramps and grooves formed therein, in a wavy configuration, in order to ensure that the product slides with as little friction as possible and to avoid adhesion and blockage.

A soft or viscous food mass is intended to mean, in particular, food masses which readily undergo an elastic or plastic change in shape during cutting. Dimensional stability is hardly present at the instant of cutting, and so greater attention must be paid when processing the food in order to maintain the existing shape. When such a food mass is cut using cutting disks, which have, in particular, a cutting edge encircling the periphery in a circular manner, the foodstuff is acted upon consistently in the circumferential direction of the cutting disks. The cutting edges can also have another shape, for example, being perforated or toothed. In this case, the food product then tends to bend and follow the cutting disk.

FIG. 1 shows a device 1 according to the invention for cutting a food band 4. A food band not shown here, which consists of an industrially produced cheese and is continuously moved forward via a conveyor belt 3, can be cut with this device. A plurality of cutting disks 2 is provided, which cutting disks are oriented parallel to a conveyance direction F of the conveyor belt 3 and cut the food band 4 into strips parallel to the conveyance direction F. A carrier shaft on which the cutting blades or disks 2 are held, and which is held with respect to a housing 9 by a rotary bearing 14, is not shown.

In FIG. 1, the device 1 is shown in an operating position. In this case, the combs 5 are each provided with a plurality of tines 6, which are located in intermediate spaces 7 between the cutting disks 2. The tines 6 act as hold-down devices in order to hold the cut food band or the strips on the conveyor belt 3 and to prevent the cut strips from adhering to the cutting disks and following said cutting disks in the circumferential direction. FIG. 1b shows the device without the cutting disks so that the combs 5 are more readily apparent.

The tines 6, a plurality thereof, are interconnected as one piece on a comb 5, and are jointly fastened on a comb holder 8, as is apparent in FIGS. 2a-d. This comb holder 8 comprises a guide rail 10, on which the combs 5 are held so as to be axially displaceable, in principle, i.e., parallel to the rotational axis A. A fastening clamp 11, which is designed to be elastic, encloses the comb 5 and the guide rail 10 and thereby acts upon the comb 5 in the direction toward the guide rail 10. In one embodiment, the fastening clamp 11 acts only such that the comb 5 or the combs are only held on the guide rail 10 without falling off thereof; movement in the axial direction of the combs 5 on the guide rail 10 is then still possible, but is prevented by the cutting disks 2. The tines 6 then floatingly orient themselves at the cutting disks 2. In an alternative embodiment, the fastening clamp 11 is dimensioned such that the combs 5 are frictionally held on the guide rail 10 by the comb 5 acting upon the guide rail 10.

Figure 2:
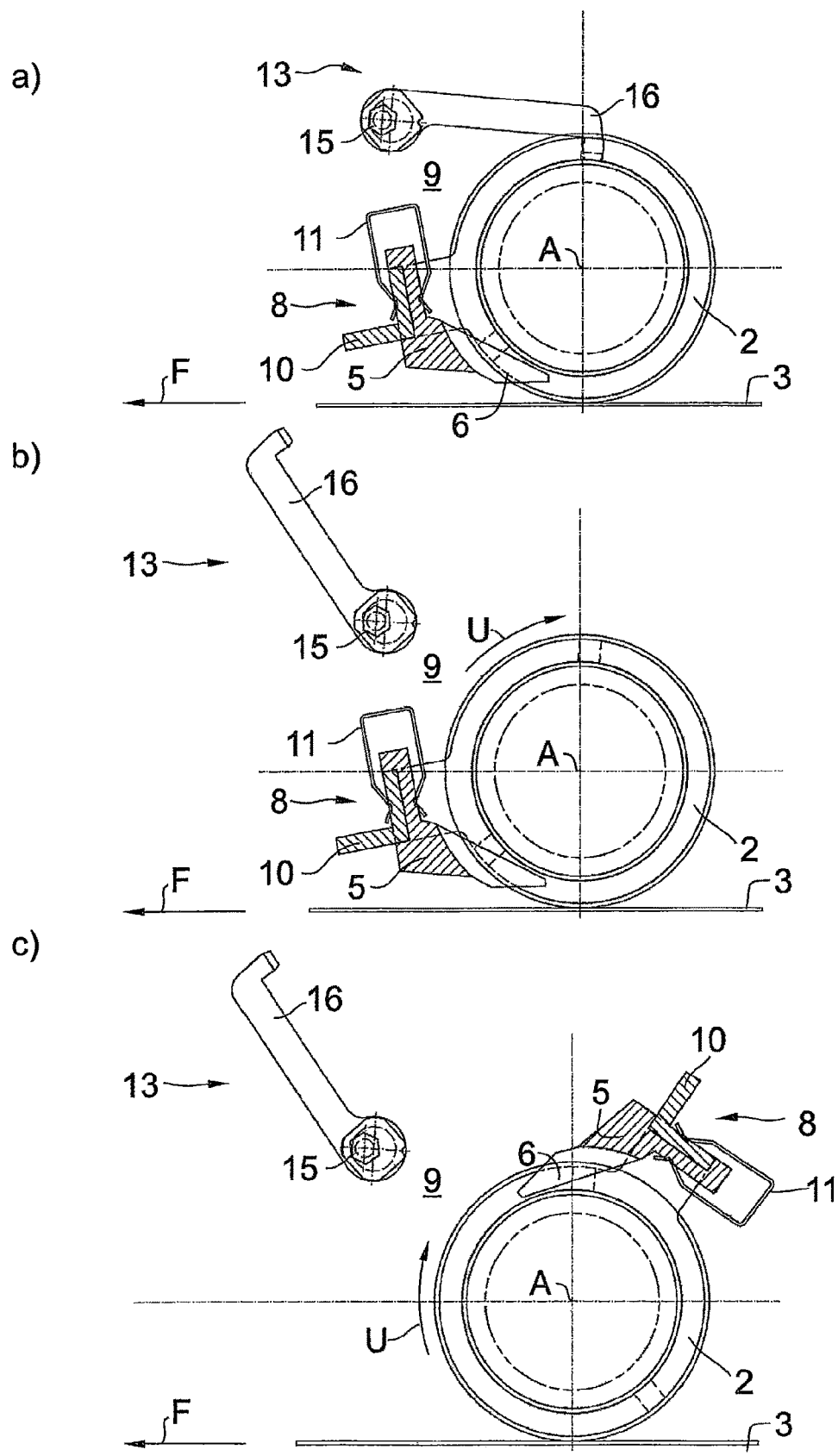
FIG. 2 shows a cross-section of the device according to FIG. 1 during the transition out of the operating position and into the maintenance position.

The comb holder 8 is held on the housing 9 of the device 1 by means of the rotary bearing 14. The rotary bearing 14 supports the comb holder 8 so as to permit rotation thereof about the rotational axis A of the cutting disks 2. If the comb holder 8, including the tines 6, is then pivoted about the rotational axis A, the tines 6 continue to remain in the same radial position in the intermediate spaces 7. Said tines do not move away from the rotational axis A, nor do they move toward the rotational axis A. Therefore, the comb holder 8, including the comb 5 and the tines 6, can be pivoted between an operating position, which is shown in FIGS. 2a and 2b, and a maintenance position, which is shown in FIG. 2c. It is advantageous, in particular, that the tines 6 do not need to be inserted into the intermediate spaces 7 during the pivoting out of the maintenance position and into the operating position.

Figure 3:
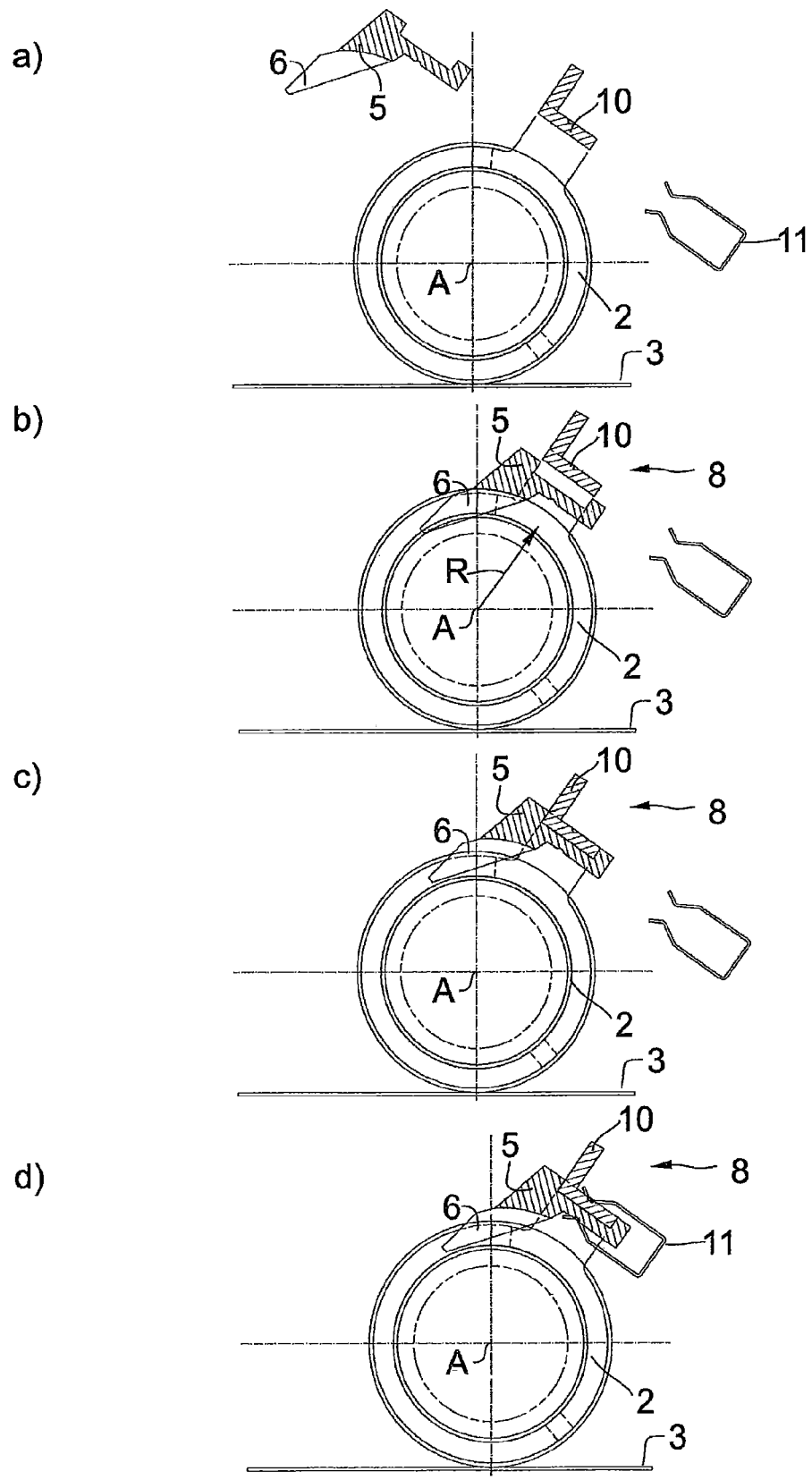
FIG. 3 shows a cross-section of the device according to FIG. 1 during different steps of the installation of the combs.

In order to be installed, the comb holder 8, including the guide rail 10, is brought into a maintenance position, as shown in FIG. 3a. In the maintenance position, the comb holder 8 is held by a fixing hook 13. In the maintenance position, the combs 5 are then inserted into the intermediate spaces 7 manually at first (FIG. 3b). Subsequently, the combs, with the tines 6 still in the intermediate spaces 7, are placed onto the guide rail 10, wherein the tines are moved outward in the radial direction R toward the guide rail until said tines rest against the guide rail (FIG. 3c). The combs 5 are fixed on the guide rail 10 via the fastening clamps 11, whereby the combs 5 are fastened on the guide rail 10 and, therefore, on the comb holder 8 (FIG. 3d).

In the maintenance position, the combs 5 and the comb holder 8 are easily accessible from above; the manual insertion of the combs 5 and the adjustment in the intermediate spaces 7 can be easily carried out. Subsequently, the fixing hook 13 is released and the comb holder 8 rotates about the rotational axis A into the operating position.

Figure 4:
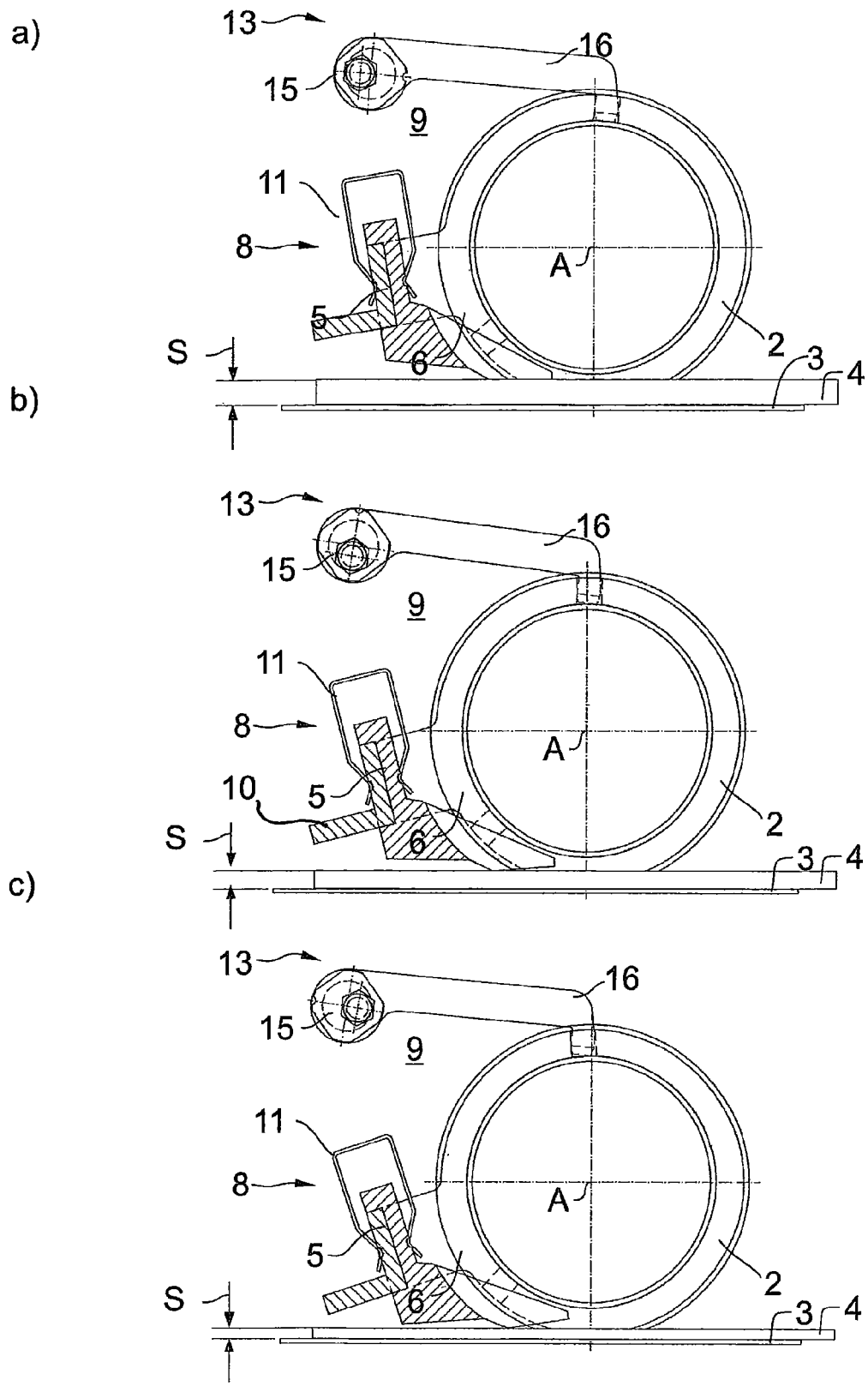
FIG. 4 shows a cross-section of the device according to FIG. 1 having different gap widths.

In the operating position, the comb 5, including the tines 6, and the conveyor belt 3 define a gap having a gap width S, through which the food band 4 is guided during the cutting process (FIGS. 4a-c). The gap 17 or the gap width S can be adjusted by changing the circumferential position of the comb holder 8 in the operating position. The gap can be changed by a few millimeters by changing the circumferential position by a few degrees. In this case, the comb holder 8 is likewise held in the operating position via the fixing hook 13, as an adjustable fixing means. The fixing hook 13 is connected to an eccentric screw 15, which is screwed into the housing 9, via the hook arm 16. The position of the fixing hook 13 or the spacing of the fixing hook 13 around the housing bore in which the eccentric screw is fastened can be adjusted by rotating the eccentric screw 15. By means of a corresponding change, the circumferential position of the comb 5 in the operating position can be adjusted by the few degrees, with the aid of which the gap width S is then adjusted.

Summarising, the invention concerns a device 1 for longitudinally cutting a band 4 of a soft food mass, in particular a cheese mass, moving in a conveyance direction (F) into a number of narrow strips. The device comprises a rotating cutting cylinder, a comb and a comb holder, wherein the rotating cutting cylinder has a rotational axis (A) and holds a number of cutting disks 2 suitable for longitudinally cutting a soft food mass, wherein the cutting disks 2 are coaxially aligned with the rotational axis (A) and spaced apart to form intermediate spaces 7 between the cutting disks 2. The comb 5 comprises a plurality of comb tines 6 adapted for engagement with the intermediate spaces 7 between the cutting disks 2 and for holding down strips cut by the cutting disks 2. Thereby, the comb 5 is held on a comb holder 8, which is pivotably mounted for pivoting the comb 5 about the rotational axis (A) between an operating position and a maintenance position.

The invention concerns further a method for installing a comb on such a device wherein in the maintenance position, the comb 5 is fastened on the comb holder 8 and wherein the comb holder 8 is pivoted about the rotational axis (A) of the blade roller 1, out of the maintenance position and into the operating position.

LIST OF REFERENCE SIGNS 1 device for longitudinal cutting having a blade roller
2 cutting disk
3 conveyor belt
4 food band
5 comb
6 tines
7 intermediate space
8 comb holder
9 housing
10 guide rail
11 fastening clamp
13 fixing hook
14 rotary bearing
15 eccentric screw
16 hook arm
A rotational axis
F conveyance direction
R radial direction
U circumferential direction
S gap width

The invention claimed is:

1. A device (1) for longitudinal cutting of a food band (4) of a soft food mass, which is moved in a conveyance direction (F)), into a number of strips,
   wherein a cutting cylinder rotatable about a rotational axis (A) is provided, on which cutting cylinder a number of cutting disks (2) greater than 2 is mounted for longitudinal cutting, wherein more than 2 of the cutting disks (2) are disposed coaxially to the rotational axis (A) in spaced apart relation to each other to form intermediate spaces (7) between the cutting disks (2) and positioned to cut into a food band (4),
   wherein a comb (5), or comb elements, having a plurality of comb tines (6) is provided, which comb tines, in an operating position, are located in the intermediate spaces (7) between the cutting disks (2) during longitudinal cutting,
   wherein the comb (5) is, or comb elements are, held on a comb holder (8), which is pivotably mounted so as to be pivotable about the rotational axis (A), wherein the comb holder (8) can be transferred from the operating position to a maintenance position by pivoting about the rotational axis (A), and wherein the device (13) further comprises a pawl or a latching lever, which is engageable with the comb holder (8) and which is held by an eccentric support (15).

2. The device according to claim 1, wherein the comb holder (8) is pivotally mounted coaxially to the rotational axis (A) via a rotary bearing (14).

3. The device according to claim 1, wherein the comb holder (8) comprises a guide rail (10) oriented parallel to the rotational axis (A).

4. The device according to claim 3, wherein the comb (5) or the comb elements are held on the guide rail (10) with fastening clamps (11) so as to be capable of floating in a direction parallel to the rotational axis (A) and are fixed by frictional engagement between the guide rail (10) and the fastening clamps (11).

5. The device according to claim 1, wherein the comb holder (8) comprises a height adjustment device for adjusting the height of the comb holder in the operating position tangentially to the rotational axis.

6. The device according to claim 1, wherein the comb or the comb elements are integrally formed as one piece out of a dimensionally stable plastic or out of stainless steel, wherein the comb tines (6) are finger-shaped, each of which are located in the intermediate spaces (7) when the comb tines are in the operating position.

7. The device according to claim 6, wherein the comb tines (6) have a deflection surface having a deflection angle, wherein the deflection angle can be adjusted by adjusting the operating position.

8. A method for installing a comb or comb elements on a device for longitudinal cutting of a food band (4) of a soft food mass, which is moved in a conveyance direction (F)), into a number of strips, wherein the method comprises (a) providing a device comprising a comb (8) or comb elements, a comb holder (8) and a blade roller (1) having a rotational axis (A) comprising coaxially mounted cutting disks (2) in axially spaced apart relation to one another forming intermediate spaces (7) between adjacent cutting disks (2), wherein the comb (8) is, or comb elements are, mountable on the comb holder (8) and the comb holder (8) is pivotable about the rotational axis (A) between a maintenance position and an operating position, wherein the comb holder (8) is in the maintenance position, (b) fastening the comb (4) or the comb elements on the comb holder (8) in the maintenance position and (c) pivoting the comb holder (8) about the rotational axis (A) of the blade roller (1) out of the maintenance position and into the operating position.

9. The method according to claim 8, wherein the comb (5) provided in step (a) comprises, or the comb elements provided in step (a) comprise, comb tines (6) having a finger-like shape, the comb tines (6) are inserted into the intermediate spaces (7) between the cutting disks (2) when the comb holder (8) is rotated from the maintenance position to the operating position in step (c) and, subsequently, (d) fixing the operating position of the comb holder (8).

\* \* \* \* \*